(12) United States Patent
Shimizu et al.

(10) Patent No.: US 11,768,103 B2
(45) Date of Patent: Sep. 26, 2023

(54) PHOTODETECTOR WITH IMPROVED APPEARANCE DESIGN AND VEHICLE INCLUDING PHOTODETECTOR OF THE SAME COMPRISING A PLURALITY OF ELECTRONIC COMPONENTS MOUNTED ON A LIGHT RECEIVING SURFACE SIDE OF A PRINTED CIRCUIT BOARD

(71) Applicants: Go Shimizu, Tokyo (JP); Keisuke Maeda, Tokyo (JP); Takashi Mai, Tochigi (JP); Kotaro Ono, Aichi (JP); Takayuki Suzuki, Aichi (JP); Satoshi Chikazawa, Aichi (JP)

(72) Inventors: Go Shimizu, Tokyo (JP); Keisuke Maeda, Tokyo (JP); Takashi Mai, Tochigi (JP); Kotaro Ono, Aichi (JP); Takayuki Suzuki, Aichi (JP); Satoshi Chikazawa, Aichi (JP)

(73) Assignees: HONDA MOTOR CO., LTD., Tokyo (JP); NIDEC MOBILITY CORPORATION, Aichi (JP)

( * ) Notice: Subject to any disclaimer, the term of this patent is extended or adjusted under 35 U.S.C. 154(b) by 0 days.

(21) Appl. No.: 17/701,585

(22) Filed: Mar. 22, 2022

(65) Prior Publication Data
US 2022/0307897 A1    Sep. 29, 2022

(30) Foreign Application Priority Data
Mar. 24, 2021    (JP) .................................. 2021-050550

(51) Int. Cl.
*G01J 1/02* (2006.01)
*G01J 1/42* (2006.01)
*B60Q 1/14* (2006.01)

(52) U.S. Cl.
CPC .......... *G01J 1/0214* (2013.01); *B60Q 1/1423* (2013.01); *G01J 1/0204* (2013.01); *G01J 1/4204* (2013.01)

(58) Field of Classification Search
CPC ...... G01J 1/0214; G01J 1/0204; G01J 1/4204; G01J 1/0271; G01J 1/0492; G01J 1/4228; G01J 1/42; G01J 2001/4247; B60Q 1/1423
(Continued)

(56) References Cited

U.S. PATENT DOCUMENTS

| 6,521,882 B1 * | 2/2003 | Sumiya ..................... G01J 1/04 356/139.01 |
| 8,963,062 B2 | 2/2015 | Sasaki et al. |
| 9,358,919 B2 * | 6/2016 | Higashikata .......... G01J 1/0407 |

FOREIGN PATENT DOCUMENTS

| JP | 2011226946 A | 11/2011 |
| JP | 2012183886 A | 9/2012 |
| JP | 20154666 A | 1/2015 |

OTHER PUBLICATIONS

Office Action in JP application No. 2021-050550, dated Dec. 20, 2022, 6 pp.

* cited by examiner

*Primary Examiner* — Que Tan Le
*Assistant Examiner* — Mai Thi Ngoc Tran
(74) *Attorney, Agent, or Firm* — HAUPTMAN HAM, LLP

(57) ABSTRACT

A photodetector including: a case including a light receiving surface provided on an upper surface and having a first region that transmits visible light and a second region that transmits less visible light than the first region; a printed circuit board provided to face the light receiving surface; and a plurality of electronic components provided on a light (Continued)

receiving surface side of the printed circuit board and including a first light receiving element configured to detect visible light. The first light receiving element is disposed at a first position of the printed circuit board exposed to the visible light transmitted through the first region. The number of mounted electronic components disposed at the first position is smaller than the number of mounted electronic components disposed at a second position of the printed circuit board other than the first position.

4 Claims, 8 Drawing Sheets

(58) Field of Classification Search
USPC .................................................. 250/208.6
See application file for complete search history.

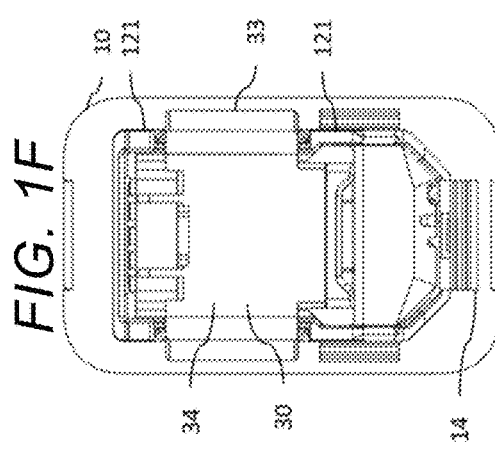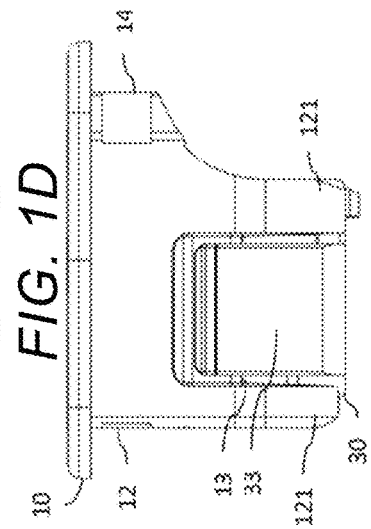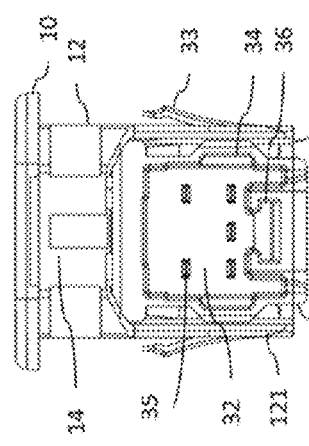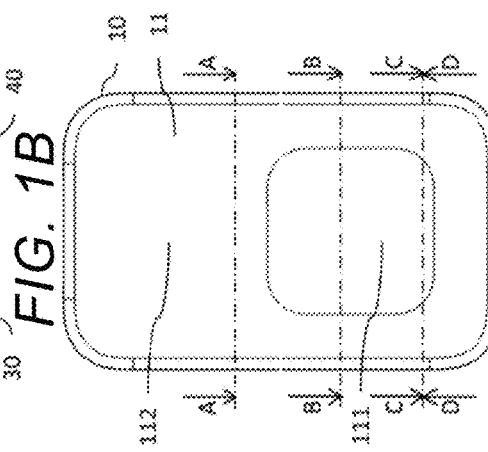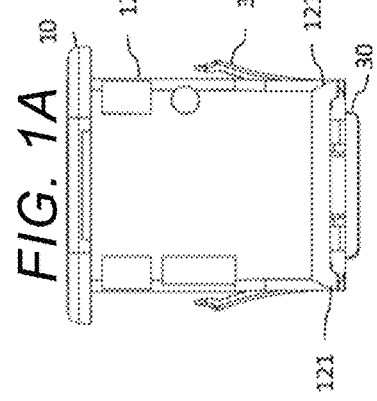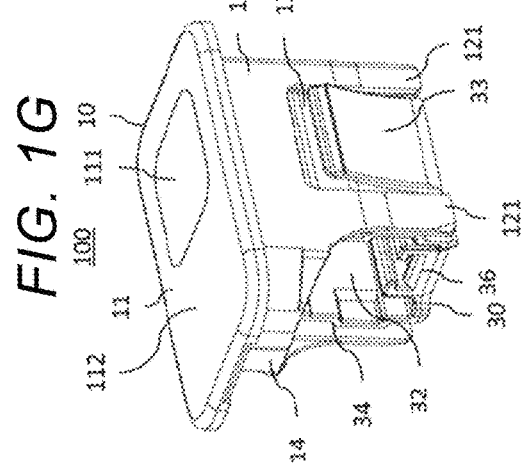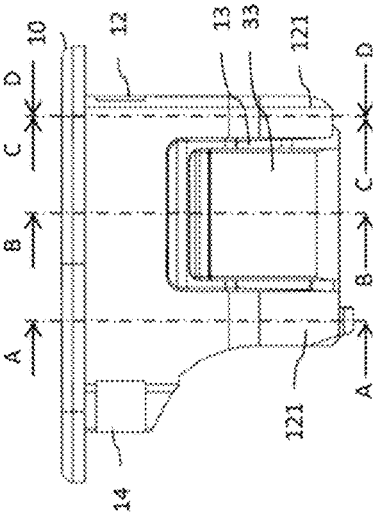

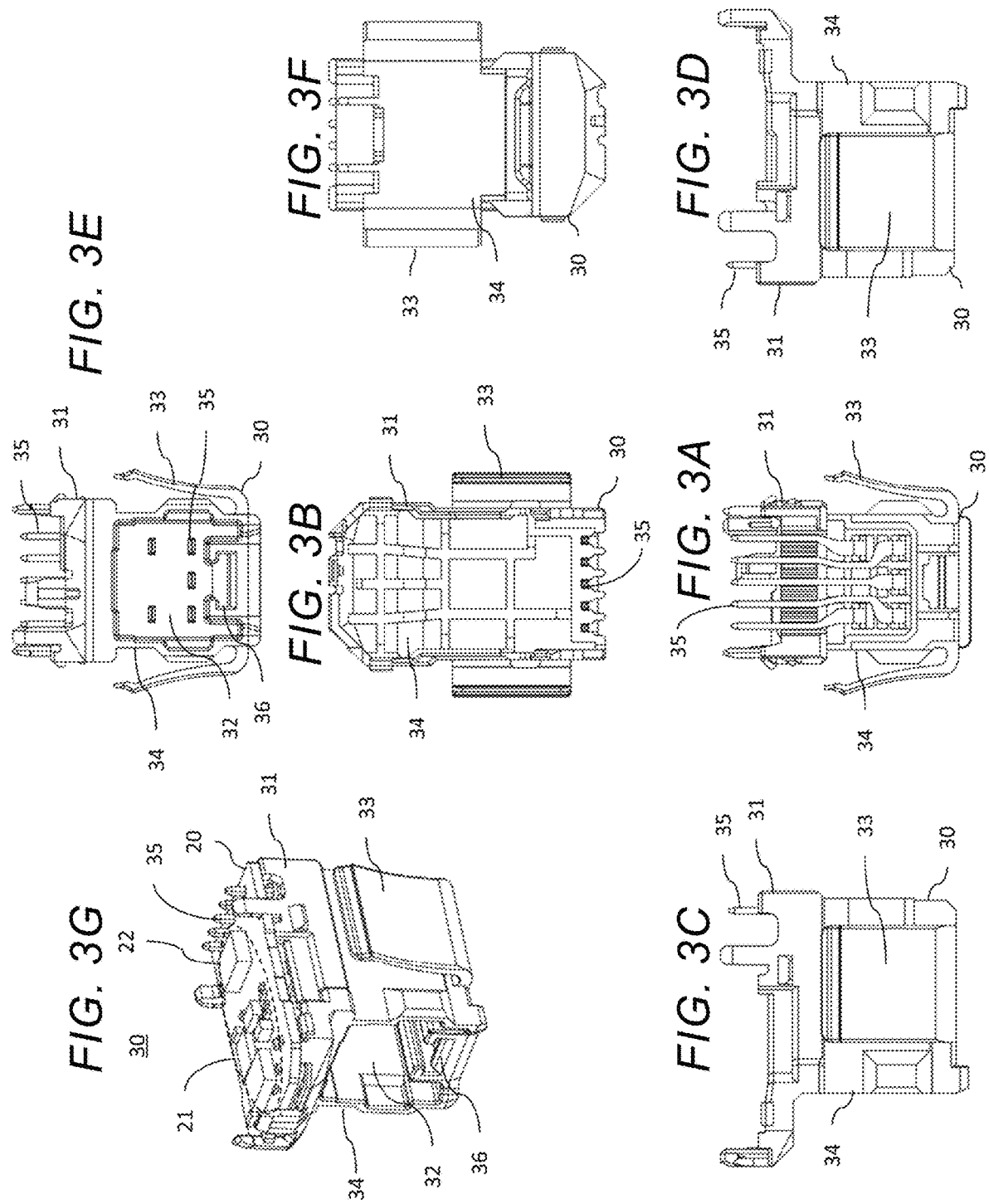

LINE OF SIGHT OF DRIVER

PHOTODETECTOR WITH IMPROVED APPEARANCE DESIGN AND VEHICLE INCLUDING PHOTODETECTOR OF THE SAME COMPRISING A PLURALITY OF ELECTRONIC COMPONENTS MOUNTED ON A LIGHT RECEIVING SURFACE SIDE OF A PRINTED CIRCUIT BOARD

CROSS-REFERENCE TO RELATED APPLICATIONS

This application is based upon and claims the benefit of priority from Japanese Patent Application No. 2021-050550 filed on Mar. 24, 2021, the entire contents of which are incorporated herein by reference.

FIELD

One or more embodiments of the present invention relate to a photodetector to be provided in a vehicle, and a vehicle including the photodetector.

BACKGROUND

In the related art, a photodetector provided in a vehicle for automatically controlling headlights, an air conditioner, and the like of the vehicle has been known. For example, as disclosed in JP-A-2011-226946 and JP-A-2015-004666, the photodetector detects the illuminance of light incident on the vehicle, the amount of solar radiation, infrared rays, and the like by a light receiving element to control the headlights, the air conditioner, and the like based on a detection result.

For example, JP-A-2011-226946 discloses a photodetector capable of facilitating assembly while realizing miniaturization. The photodetector includes an illuminance sensor and a solar radiation sensor, a microcomputer that controls the headlights and tail lights based on a detection result of the illuminance sensor, a printed wiring board on which the illuminance sensor and the microcomputer are mounted, a holding member that holds the printed wiring board, and a housing that stores the holding member.

Further, JP-A-2015-004666 discloses a photodetector capable of detecting ambient light incident at a predetermined tilt angle from all directions while realizing miniaturization. The photodetector guides light that has passed through a lens on an upper side by a light guide member and detects the light by a photodetection element on a lower side.

SUMMARY

In order to miniaturize a photodetector, electronic components are often mounted on a single printed circuit board, so that a mounting density of the electronic components inevitably increases. However, a lens that transmits light is provided on an upper surface of the photodetector, and a passenger of a vehicle sees the electronic components and soldered parts on the printed circuit board disposed under the photodetector through the lens, so that an appearance design of the photodetector is deteriorated.

One or more embodiments of the present invention have been made in view of such circumstances, and an object thereof is to provide a photodetector that realizes miniaturization and also improves an appearance design, and a vehicle including the photodetector.

In one or more embodiments of the present invention, there is provided a photodetector to be installed in a vehicle, the photodetector including: a case including a light receiving surface provided on an upper surface, the light receiving surface having a first region that transmits visible light and a second region that transmits less visible light than the first region; a printed circuit board provided to face the light receiving surface; and a plurality of electronic components provided on a light receiving surface side of the printed circuit board, the plurality of electronic components including a first light receiving element configured to detect visible light, wherein the first light receiving element is disposed at a first position of the printed circuit board, the first position being exposed to the visible light transmitted through the first region, and the number of mounted electronic components disposed at the first position is smaller than the number of mounted electronic components disposed at a second position of the printed circuit board, the second position being other than the first position.

With this configuration, by reducing the number of mounted electronic components disposed at the position exposed to visible light to be smaller than the number of mounted electronic components disposed at other positions, it is possible to provide a photodetector that realizes miniaturization and also improves an appearance design.

Further, only the first light receiving element among the plurality of electronic components may be disposed at the first position when viewed from a driver's seat of the vehicle.

With this configuration, when viewed from the driver, only the minimum necessary electronic components are seen, so that it is possible to improve the appearance design.

Further, the photodetector may further include a second light receiving element configured to detect light rays other than visible light, the second region may transmit the light rays other than visible light, and the second light receiving element may be disposed at the second position.

With this configuration, by not disposing the light receiving element configured to detect invisible light at the position exposed to visible light, it is possible to provide the photodetector that realizes miniaturization and does not deteriorate the appearance design even with multiple functions.

In one or more embodiments of the present invention, there is provided a vehicle including the photodetector.

With this configuration, by reducing the number of mounted electronic components disposed at the position exposed to visible light to be smaller than the number of mounted electronic components disposed at the other positions, it is possible to provide the vehicle including the photodetector that realizes miniaturization and also has the good appearance design.

As described above, according to one or more embodiments of the present invention, it is possible to provide a photodetector that realizes miniaturization and also improvs an appearance design, and a vehicle including the photodetector.

BRIEF DESCRIPTION OF DRAWINGS

FIG. 1A is a front view, FIG. 1B is a plan view, FIG. 1C is a left side view, FIG. 1D is a right side view, FIG. 1E is a rear side view, FIG. 1F is a bottom view, and FIG. 1G is a perspective view of a photodetector according to a first embodiment of the present invention.

FIG. 3A is a front view, FIG. 3B is a plan view, FIG. 3C is a left side view, FIG. 3D is a right side view, FIG. 3E is a rear side view, FIG. 3F is a bottom view, and FIG. 3G is a perspective view of a lower case of the photodetector according to the first embodiment of the present invention.

DETAILED DESCRIPTION

Figure 2E:
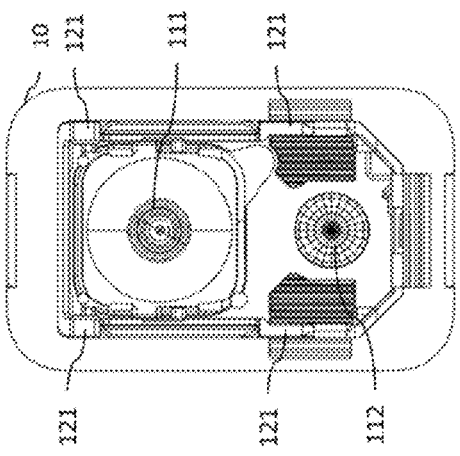
FIG. 2E is a rear side view.
Figure 2F:
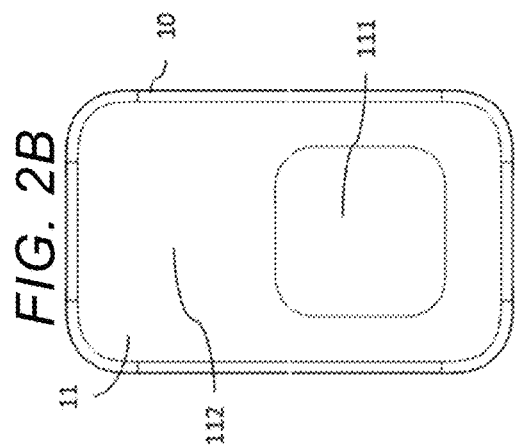
FIG. 2F is a bottom view.
Figure 2D:
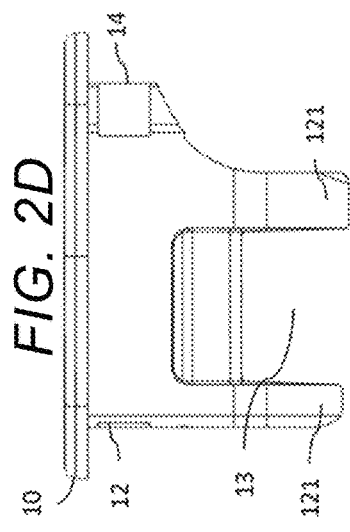
FIG. 2D is a right side view.
Figure 2B:
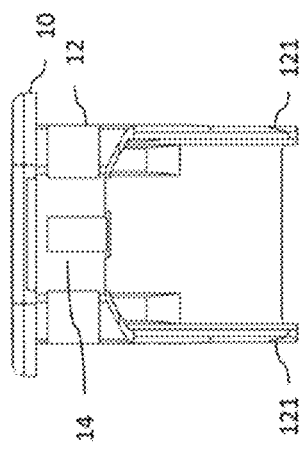
FIG. 2B is a plan view.
Figure 2A:
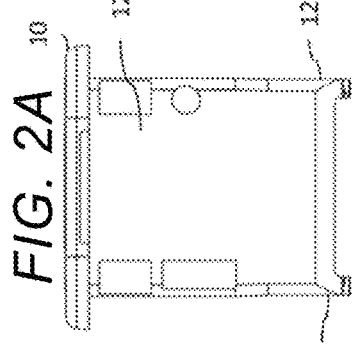
FIG. 2A is a front view.
Figure 2G:
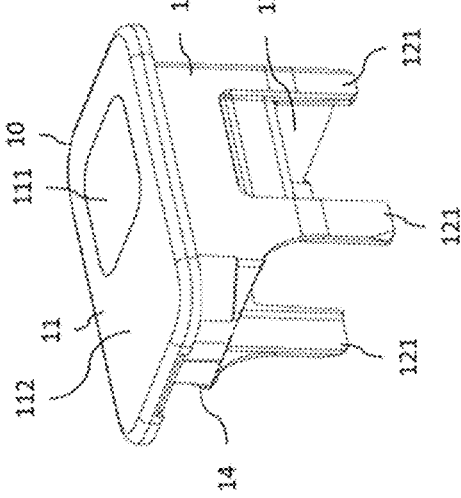
FIG. 2G is a perspective view of an upper case of the photodetector according to the first embodiment of the present invention.
Figure 2C:
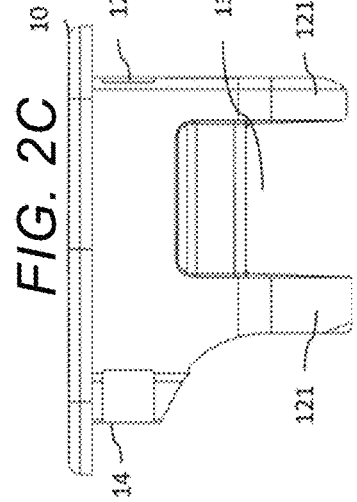
FIG. 2C is a left side view.
Figure 4A:
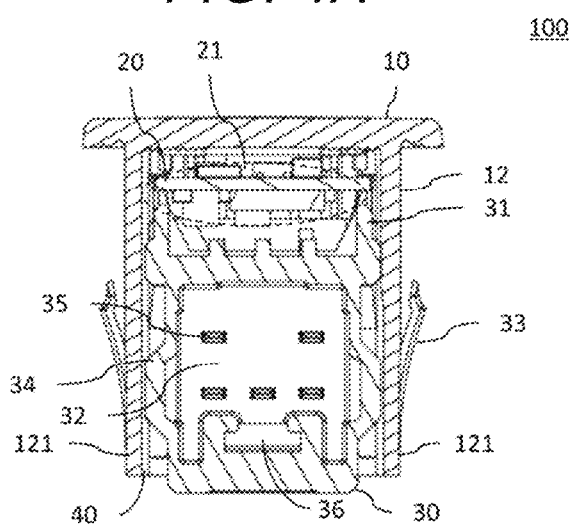
FIG. 4A is a cross-sectional view taken along a line A-A.
Figure 4B:
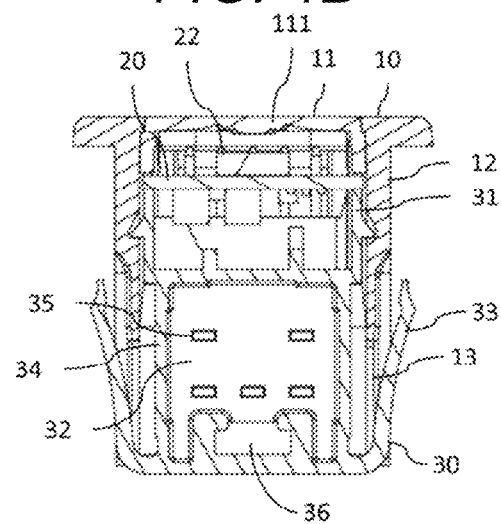
FIG. 4B is a cross-sectional view taken along a line B-B.
Figure 4C:
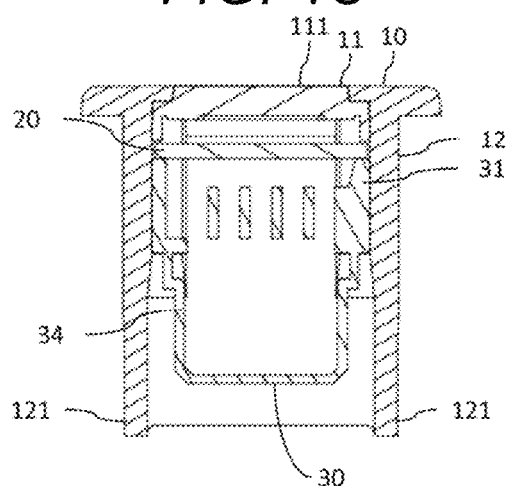
FIG. 4C is a cross-sectional view taken along a line C-C.
Figure 4D:
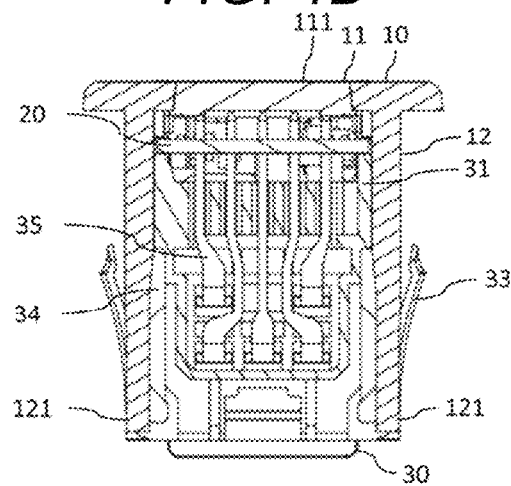
FIG. 4D is a cross-sectional view taken along a line D-D of the photodetector according to the first embodiment of the present invention. Each cross section is shown in FIGS. 1B and 1C.

In embodiments of the invention, numerous specific details are set forth in order to provide a thorough understanding of the invention. However, it will be apparent to one of ordinary skill in the art that the invention may be practiced without these specific details. In other instances, well-known features have not been described in detail to avoid obscuring the invention.

Hereinafter, an embodiment of the present invention will be described with reference to the accompanying drawings.

First Embodiment

A photodetector 100 according to the embodiment is a so-called auto light sensor for automatically controlling the turning on and off of headlights and tail lamps (not shown) of a vehicle (mainly an automatic four-wheeled vehicle). Typically, when a driver sets a switch for performing an operation of turning on and off the headlights and the like to an auto position, the headlights and the like are turned on and off according to illuminance detected by the photodetector 100.

The photodetector 100 includes an illuminance sensor that detects illuminance of light incident on a periphery of the vehicle or inside the vehicle, a microcomputer (microcontroller, not shown) that determines whether to turn on or off light based on a detection result detected by the illuminance sensor, and a communication circuit (not shown) that delivers a determination result of the microcomputer as a control signal to a vehicle control unit (not shown) via, for example, a Controller Area Network (CAN). The illuminance sensor includes, for example, a photodiode, a transistor, and the like which are integrated with other, converts light incident on a light receiving element into a current, and detects light when a voltage corresponding to brightness appears at both ends of a resistor installed in a circuit. There are other methods for detecting light, and the present invention is not limited thereto.

When illuminance detected by the illuminance sensor is smaller than a predetermined threshold value, the microcomputer determines that the periphery of the vehicle is dark and outputs a command to turn on the headlights and the like. Further, when the illuminance detected by the illuminance sensor is larger than the predetermined threshold value, the microcomputer determines that the periphery of the vehicle is bright and outputs a command to turn off the headlights and the like. That is, the illuminance sensor and the microcomputer constitute an auto light control device that automatically controls turning on and off states of the headlights the like. Further, the photodetector 100 may be used to control an air conditioner or the like of the vehicle by including an infrared sensor inside and detecting a temperature in the vehicle.

A structure of the photodetector 100 in the embodiment will be described in detail with reference to FIGS. 1A to 6B. The photodetector 100 includes an upper case 10 having a light receiving surface on an upper surface, a lower case 30 combined with the upper case 10, and a printed circuit board 20 accommodated between the upper case 10 and the lower case 30.

The upper case 10 includes a light receiving portion 11 having an upper surface serving as the light receiving surface for light incident on the vehicle, and a side portion 12 extending downward from a lower surface of the light receiving portion 11 to form a side surface of the upper case 10. The light receiving surface of the light receiving portion 11 is composed of the light receiving surface having a visible light transmission portion 111 (first region) that transmits visible light and an infrared light transmission portion 112 (second region) that transmits infrared light while transmitting a smaller amount of visible light than the visible light transmission portion 111. A lens is formed on a back surface of the visible light transmission portion 111 and the infrared light transmission portion 112 (see FIG. 2F), and light rays are concentrated on respective facing light receiving elements by the lens. The visible light transmission portion 111 is preferably made of polycarbonate that transmits visible light well. In the embodiment, a small amount of black pigment in polycarbonate, which is difficult to transmit infrared light, is mixed with the visible light transmission portion 111 and is fitted into the infrared light transmission portion 112 integrally molded with the side portion 12. A large amount of pigment is mixed with the infrared light transmission portion 112 such that visible light is difficult to be transmitted. The infrared light transmission portion 112 may not transmit visible light at all.

The side portion 12 is formed so as to cover at least the printed circuit board 20 and a periphery of a support portion 31 of the lower case 30 on all surfaces, and extends to a vicinity of a lower end of the lower case 30 in order to sufficiently cover a connection terminal 35 attached to the lower case 30 on a front surface side. On the other hand, since the side portion 12 fits an opening 32 of the lower case 30 for receiving an external connector on a back surface side, a part extending downward from the lower surface of the light receiving portion 11 is short and the side portion 12 approximately covers only the printed circuit board 20 and the periphery of the support portion 31 of the lower case 30.

The side portion 12 has a U-shaped cut portion 13 in a substantially central part on a left side surface and a right side surface, that is, on surfaces other than a part (front surface side) extending to the vicinity of the lower end of the lower case 30 to sufficiently cover the connection terminal 35 and a part fitting the opening 32 and extending downward shortly. The side portion 12 has side extending portions 121 extending to the vicinity of the lower end of the lower case 30 and extending up to a lower side of the opening 32 on both sides of the cut portion 13. When being attached to the vehicle, the cut portion 13 is provided to not interfere with a hook 33 even when the hook 33 of the lower case 30 is bent inward. As a result, miniaturization of an overall shape of the photodetector 100 can be realized. Further, the cut portion 13 preferably has a shape corresponding to the hook 33 of the lower case 30. As a result, it is possible to efficiently reduce an overall size without interference when being attached.

Further, the side extending portion 121 existing on a side of the cut portion 13, particularly, the side extending portion 121 on a side of the opening 32 extends up to the vicinity of the lower end of the lower case 30 which is the lower side of the opening 32. As a result, even in a case where a liquid such as water flows along the side portion 12, it is possible to prevent the liquid from wrapping around the lower case 30.

The lower case 30 has a connector accommodating body 34 formed in a substantially rectangular parallelepiped for receiving the external connector, a support portion 31 formed at an upper part of the connector accommodating body 34 to support the printed circuit board 20, an opening 32 for inserting the external connector into a back surface side (one side surface) of the lower case 30, the connection terminal 35 on a surface (front surface side) facing the opening 32, a connector guide portion 36 for guiding the external connector provided at a bottom of the connector accommodating body 34 to the connection terminal 35, and the hook 33 for attaching the photodetector 100 (or the lower case 30) to the vehicle on the left side surface and the right side surface (other side surface).

The support portion 31 is formed to have substantially the same shape as the printed circuit board 20 in an outer shape in a plan view, and preferably floats the printed circuit board 20 and supports the printed circuit board 20 on the periphery thereof in consideration of the electronic components which are mounted on a back side of the printed circuit board 20. The opening 32 substantially matches a shape of the external connector in an insertion direction. The external connector is inserted from the opening 32 and guided to the connector guide portion 36 to be press-fitted into one end of the connection terminal 35. Since the other end of the connection terminal 35 is connected to the printed circuit board 20, the external connector is electrically connected to the printed circuit board 20 by being press-fitted, and delivers an electric signal from the printed circuit board 20 to the vehicle control unit.

On the left side surface and the right side surface, the hook 33 stands up from a lower part of the connector accommodating body 34 and is formed to spread to both sides toward the upper side. The hook 33 has elasticity. For example, when being attached to an attachment hole provided in a dashboard of the vehicle, the photodetector 100 is pushed into the attachment hole and gradually bent inward, and a tip of the hook 33 passes through an edge of the attachment hole and returns to its original shape, so that the photodetector 100 is attached to the vehicle. The lower case 30, particularly, the hook 33 is preferably made of elastic polybutylene terephthalate.

The printed circuit board 20 faces the back side of the light receiving surface of the light receiving portion 11, and is mounted with a plurality of electronic components 21 including the illuminance sensor 22 (first light receiving element) that detects visible light, the infrared sensor 23 (second light receiving element) that detects infrared light, and other electronic components (for example, the microcomputer, the resistor, the capacitor, and the like). Of course, electronic components other than the above-described electronic components may be disposed on the back side of the printed circuit board 20. The illuminance sensor 22 provided on a light receiving surface side of the printed circuit board 20 is disposed directly below the visible light transmission portion 111 of the upper case 10, and other electronic components including the infrared sensor 23 are disposed directly below the infrared light transmission portion 112 of the upper case 10. By demonstrating a function of each of the sensors and disposing the other electronic components directly below the infrared light transmission portion 112 that does not transmit visible light compared to the visible light transmission portion 111, it is possible to minimize the electronic components that can be seen through the visible light transmission portion 111, thereby improving appearance design as a result.

Figure 6A:
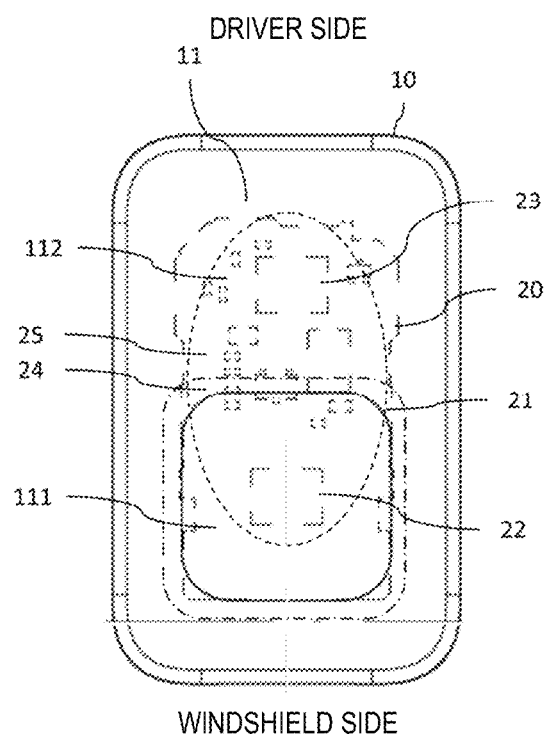
FIG. 6A is a plan view in which the printed circuit board provided inside is illustrated and FIG. 6B is a perspective view excluding the upper case of the photodetector according to the first embodiment of the present invention.
Figure 6B:
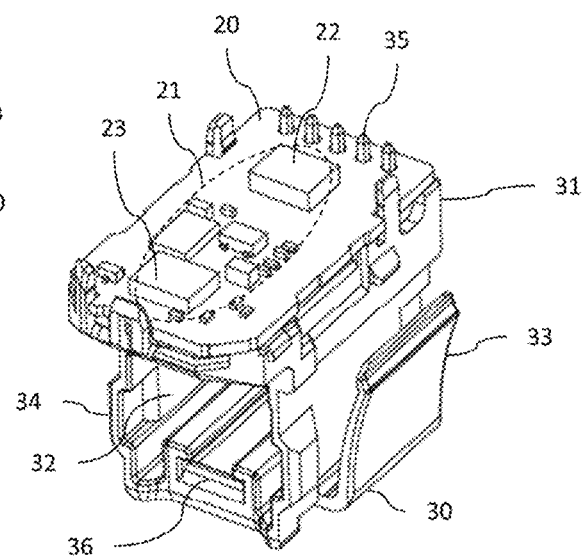

The visible light transmitted through the visible light transmission portion 111 is incident on inside the photodetector 100, and a region (first position 24), which is directly exposed to the printed circuit board 20, is slightly larger than the visible light transmission portion 111 in a plan view (see the first position 24 shown by the one-dot chain line in FIG. 6A) in consideration of a distance from the light receiving surface to the printed circuit board 20 and the visible light incident on the light receiving surface diagonally instead of vertically. Since the first position 24 is a region directly exposed to visible light on the printed circuit board 20, in other words, the first position 24 is a region which is seen by the human eye through the visible light transmission portion 111.

Therefore, the illuminance sensor 22 is disposed at the first position 24, and the number of mounting points of the electronic components disposed at the first position 24 is preferably smaller than the number of mounting points of the electronic components disposed at the second position 25 other than the first position 24 on the printed circuit board 20. The second position 25 is a region outside the one-dot chain line of the first position 24 shown in FIG. 6A, in other words, a region which is not seen by the human eye through the visible light transmission portion 111. In this way, by reducing the number of mounting points of the electronic components disposed at the position exposed to the visible light to be smaller than the number of mounting points of the electronic components disposed at the other positions, it is possible to provide the photodetector 100 that improves the appearance design.

Further, by disposing the infrared sensor 23 at the second position 25, that is, not disposing the infrared sensor 23 for detecting invisible light at the position exposed to visible light, it is possible to provide the photodetector 100 which does not deteriorate the appearance design even with multiple functions.

In the photodetector 100, the lower case 30 is configured to be fitted to the side portion 12 of the upper case 10 such that the side portion 12 of the upper case 10 surrounds the printed circuit board 20 and the support portion 31 of the lower case 30, which supports the printed circuit board 20. Further, as described above, part of the side portion 12 adjacent to the side of the cut portion 13 of the upper case 10, serving as the side extending portion 121, extends up to the lower side of the opening 32. As a result, it is possible to provide the photodetector 100 realizing miniaturization and also having good drainage property by preventing the liquid from wrapping around and entering the external connector.

Figure 5:
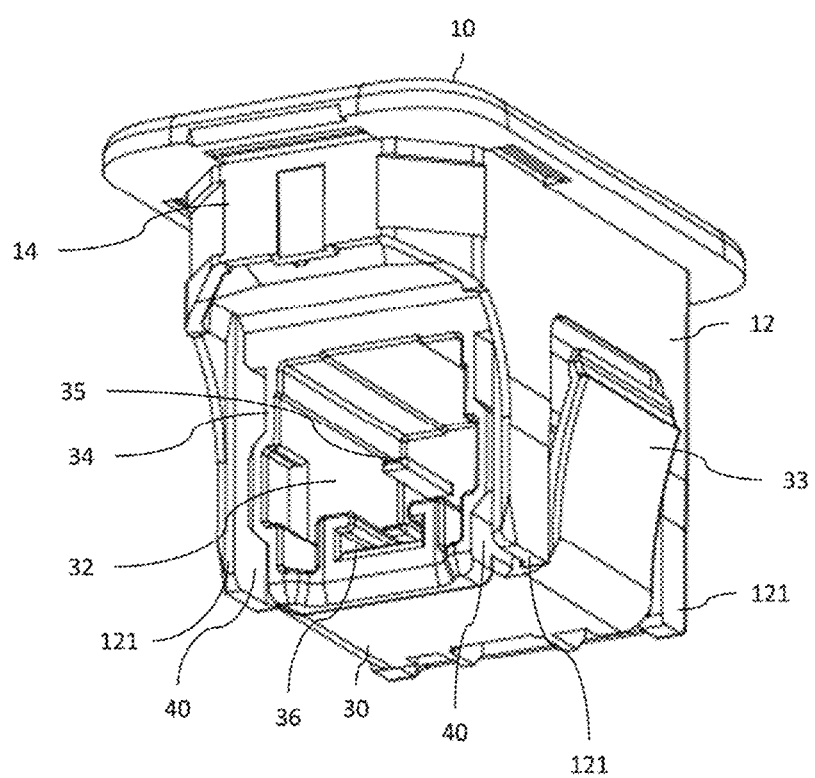
FIG. 5 is a perspective view of the photodetector according to the first embodiment of the present invention.

Further, as shown in FIG. 5, the photodetector 100 preferably includes a gap 40 for preventing the liquid from climbing up, between an outer side surface of the connector accommodating body 34 of the lower case 30 and an inner side surface of the side extending portion 121. When there is no gap 40, the liquid that has flowed down to the lower end of the side extending portion 121 due to the capillary phenomenon between the connector accommodating body 34 and the side extending portion 121 may crawl up and wrap around and entering the external connector. In this way, since the gap 40 exists, it possible to prevent the liquid that has flowed down to the side extending portion 121 from climbing up, so that it is possible to improve the drainage property in order to prevent the liquid from wrapping around and entering the external connector.

Further, the side portion 12 of the upper case 10 on the back surface side preferably includes an overhanging portion 14 formed to project in a side view to correspond to a side surface (one side surface) on the back surface side of the lower case 30 having the opening 32 through which the external connector is inserted. In this way, by providing the overhanging portion 14 on the upper side of the side surface corresponding to one side surface of the lower case 30, that is, the side surface to which the external connector is connected, it is possible to prevent the liquid from wrapping around and entering the external connector even though the liquid that has flowed along the side portion 12 on the back surface side drips from the lower end.

Figure 7:
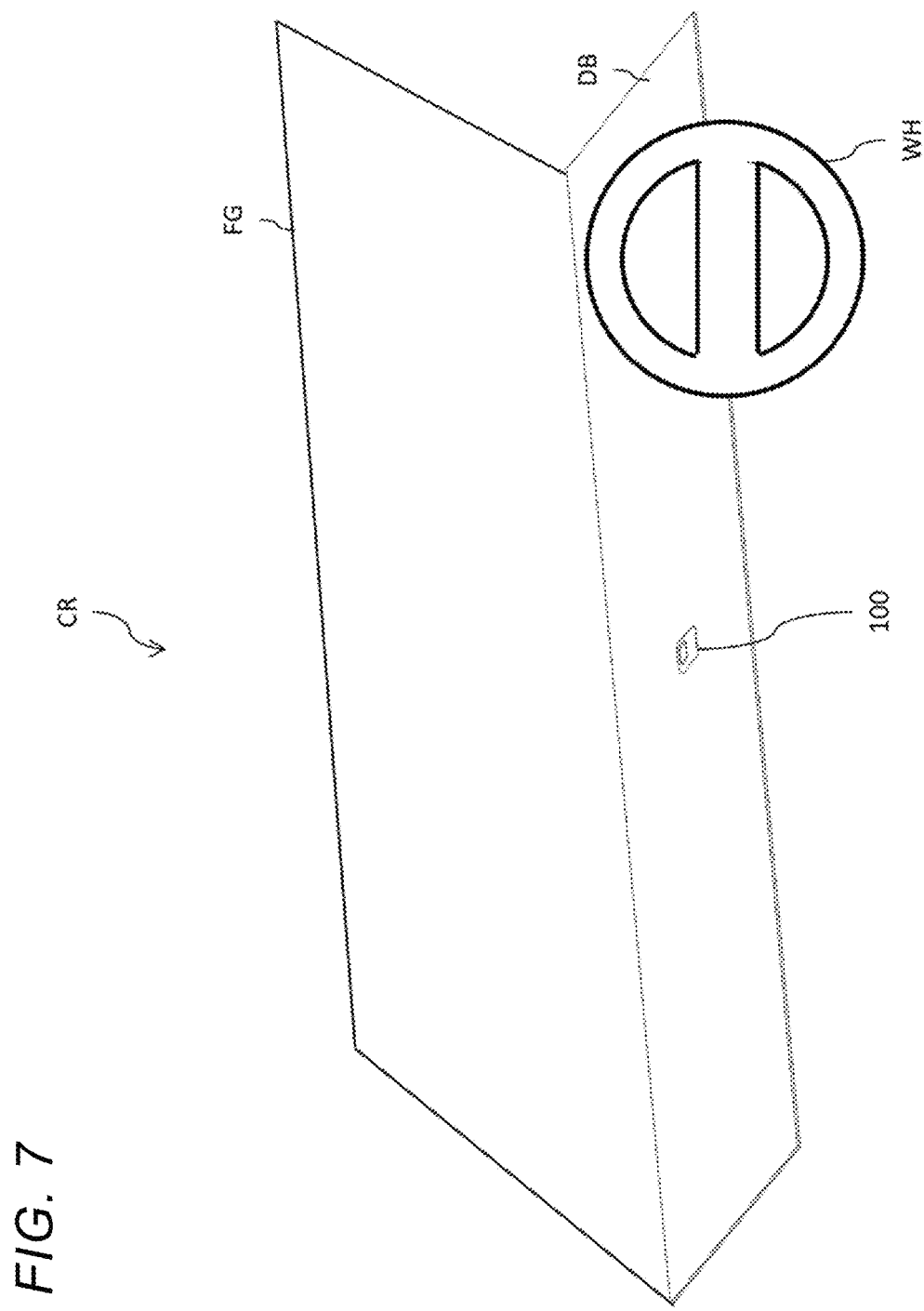
FIG. 7 is a diagram showing a case where the photodetector according to the first embodiment of the present invention is installed in a vehicle.
Figure 8:
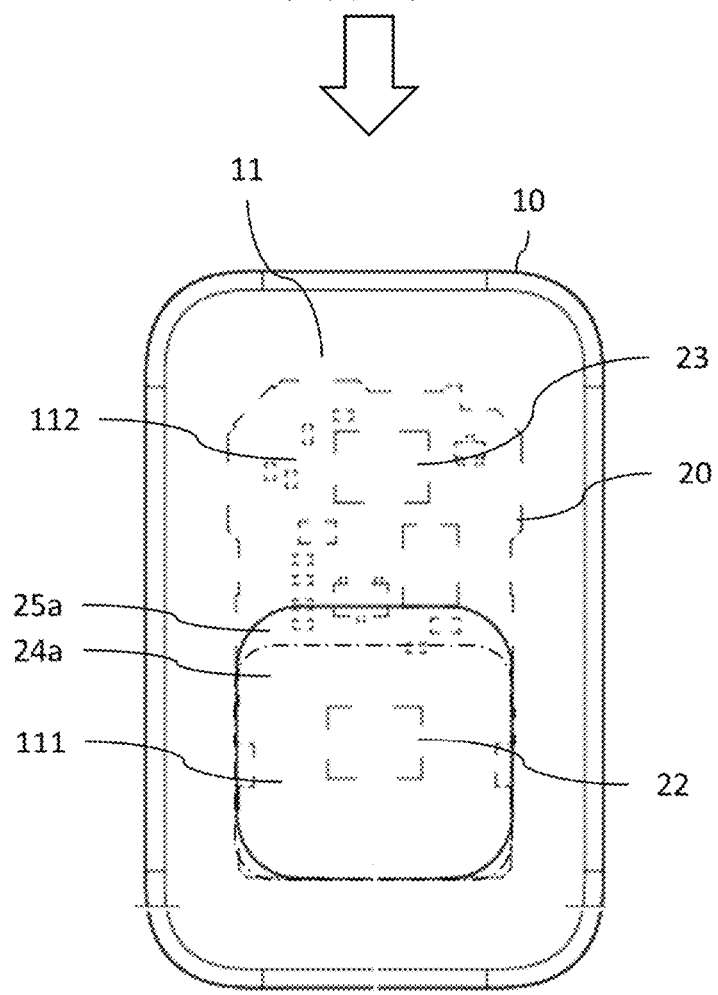
FIG. 8 is an explanatory diagram illustrating how the photodetector according to the first embodiment of the present invention is seen from the driver's point of view.

A case where the photodetector 100 is attached to a vehicle CR will be described with reference to FIGS. 7 to 8. As shown in FIG. 7, the photodetector 100 is often installed on a dashboard DB of the vehicle CR to detect light incident from an inclined windshield FG. When the photodetector 100 is attached to the dashboard DB, as shown in FIG. 7, the photodetector 100 is preferably installed such that the visible light transmission portion 111 is disposed on a windshield FG side and the infrared light transmission portion 112 is disposed on a driver side. By installing the photo detector 10 in the above-described orientation, when viewed from the driver sitting in front of a handle WH, the number of electronic components seen through the visible light transmission portion 111 is further reduced, as shown in FIG. 8. That is, the first position 24 shown in FIG. 6A is a region in consideration of visible light incident from any directions, but a region seen when viewed from a direction of the driver is a first position 24a shown in FIG. 8 and exists in a second position 25a which is a region where most of the electronic components on the printed circuit board 20 are not seen.

In this way, even when electronic components other than the illuminance sensor 22 is seen directly under the visible light transmission portion 111 in a plan view, by disposing the electronic components of the printed circuit board 20 using parallax in consideration of the driver's point of view, it is possible to secure the sufficiently large visible light transmission portion 111 and while reducing the number of mounted electronic components seen from the driver, thereby improving the appearance design. Further, it is preferable that only the illuminance sensor 22 among the plurality of electronic components is disposed at the first position 24a from the driver's seat of the vehicle CR. With this configuration, since only the minimum necessary electronic components can be seen when viewed from the driver, it is possible to further improve the appearance design.

Further, since the vehicle CR includes the photodetector 100, it is possible to reduce the number of mounting mounted electronic components disposed at a position exposed to visible light to be smaller than the number of mounted electronic components disposed at other positions, so that it is possible to provide the vehicle CR including the photodetector 100 that realizes miniaturization and also has a good appearance design.

It should be noted that the present invention is not limited to the illustrated embodiment, and can be implemented with a configuration in a scope that does not departs from the content described in each section of the claims. That is, the present invention is mainly and particularly illustrated and described with respect to a specific embodiment, and those skilled in the art can make various modifications in the quantity and other detailed configurations with respect to the above-described embodiment without departing from a scope of the technical idea and an object of the present invention.

While the invention has been described with respect to a limited number of embodiments, those skilled in the art, having benefit of this disclosure, will appreciate that other embodiments can be devised which do not depart from the scope of the invention as disclosed herein. According, the scope of the invention should be limited only by the attached claims.

The invention claimed is:

1. A photodetector to be installed in a vehicle, the photodetector comprising:
   a case comprising a light receiving surface provided on an upper surface, the light receiving surface having a first region that transmits visible light and a second region that transmits less visible light than the first region;
   a printed circuit board mounted to face the light receiving surface; and
   a plurality of electronic components mounted on a light receiving surface side of the printed circuit board, the plurality of electronic components comprising a first light receiving element configured to detect visible light,
   wherein the first light receiving element is disposed at a first position of the printed circuit board, the first position being exposed to the visible light transmitted through the first region, and the number of mounted electronic components disposed at the first position is smaller than the number of mounted electronic components disposed at a second position of the printed circuit board, the second position being other than the first position.

2. The photodetector according to claim 1,
   wherein only the first light receiving element among the plurality of electronic components is disposed at the first position when viewed from a driver's seat of the vehicle.

3. The photodetector according to claim 1, further comprising:
   a second light receiving element configured to detect light rays other than visible light,
   wherein the second region transmits the light rays other than visible light, and
   wherein the second light receiving element is disposed at the second position.

4. A vehicle comprising the photodetector according to claim 1.

* * * * *